(12) United States Patent
Jiang et al.

(10) Patent No.: US 11,275,208 B2
(45) Date of Patent: Mar. 15, 2022

(54) FABRICATION OF POLYMER WAVEGUIDE INTERCONNECT BETWEEN CHIPS WITH A GAP AND/OR STEP

(71) Applicant: ARIZONA BOARD OF REGENTS ON BEHALF OF THE UNIVERSITY OF ARIZONA, Tucson, AZ (US)

(72) Inventors: Linan Jiang, Tucson, AZ (US); Stanley K. H. Pau, Tucson, AZ (US); Robert A. Norwood, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/975,819

(22) PCT Filed: Feb. 26, 2019

(86) PCT No.: PCT/US2019/019539
§ 371 (c)(1),
(2) Date: Aug. 26, 2020

(87) PCT Pub. No.: WO2019/165414
PCT Pub. Date: Aug. 29, 2019

(65) Prior Publication Data
US 2021/0373236 A1  Dec. 2, 2021

Related U.S. Application Data

(60) Provisional application No. 62/635,106, filed on Feb. 26, 2018.

(51) Int. Cl.
*G02B 6/138* (2006.01)
*G02B 6/42* (2006.01)
(Continued)

(52) U.S. Cl.
CPC ........ *G02B 6/138* (2013.01); *B29D 11/00663* (2013.01); *G02B 6/305* (2013.01); *G02B 6/428* (2013.01); *G02B 6/43* (2013.01)

(58) Field of Classification Search
CPC ........ G02B 6/1221; G02B 6/138; G02B 6/30; G02B 6/305; G02B 6/428; G02B 6/43; B29D 11/00682; B29D 11/00663
(Continued)

(56) References Cited

U.S. PATENT DOCUMENTS

2007/0227193 A1* 10/2007 Shimizu ................ G02B 1/045
65/386
2008/0260341 A1* 10/2008 Shibata .................. G03F 7/032
385/129
(Continued)

*Primary Examiner* — Michael P Mooney
(74) *Attorney, Agent, or Firm* — Mayer & Williams, PC; Stuart H. Mayer

(57) ABSTRACT

A method of forming an optical interconnect between first and second photonic chips located on an optical printed circuit board includes applying a flexible, freestanding film onto the first and second chips so that the film extends over a gap and/or step between the chips. The film includes a photosensitive layer having a refractive index that decreases by exposure to radiation and a backing layer. The film is exposed to a flood exposure having a radiation dosage penetrating the backing layer and only a surface sublayer of the photosensitive layer. After curing the film, the backing layer is removed so that the photosensitive layer remains on the first and second chips. The photosensitive layer is selectively exposed to a second radiation dosage to define waveguide core(s) in unexposed regions of the photosensitive layer below the surface sublayer. The photosensitive layer is heated to cure the selectively exposed portions.

13 Claims, 8 Drawing Sheets

(51) Int. Cl.
   *G02B 6/43*   (2006.01)
   *B29D 11/00*  (2006.01)
   *G02B 6/30*   (2006.01)

(58) Field of Classification Search
   USPC .......................................... 385/14, 129–132
   See application file for complete search history.

(56) References Cited

U.S. PATENT DOCUMENTS

| | | | |
|---|---|---|---|
| 2008/0273853 A1* | 11/2008 | Khan | G02B 6/1221 |
| | | | 385/129 |
| 2009/0046986 A1* | 2/2009 | Maeda | C08F 220/30 |
| | | | 385/143 |
| 2010/0059822 A1 | 3/2010 | Pinguet et al. | |
| 2013/0221550 A1 | 8/2013 | Koos et al. | |
| 2016/0266322 A1 | 9/2016 | Epitaux et al. | |
| 2016/0341915 A1 | 11/2016 | Boldicke et al. | |
| 2017/0068057 A1 | 3/2017 | Fiebig et al. | |
| 2020/0379175 A1* | 12/2020 | Jiang | B29D 11/00 |

\* cited by examiner

DRY FILM RESIST ON CHIPS WITH A GAP IN BETWEEN

FABRICATION OF POLYMER WAVEGUIDE INTERCONNECT BETWEEN CHIPS WITH A GAP AND/OR STEP

GOVERNMENT FUNDING

This invention was made with government support under Grant No. FA8650-15-2-5220, awarded by Air Force Material Command. The government has certain rights in the invention.

BACKGROUND

An important problem in optical packaging involves the optical interconnection of planar-integrated photonic integrated circuits (chip-chip connections) and the connection of such circuits to the external world. Photonic integrated circuits or "chips" refer to waveguide-based photonic components, including optical integrated devices such as lasers, optical amplifiers, switches, filters, modulators, splitters, phase shifters, variable attenuators, detectors, and the like. Photonic chips can also include integration with semiconductor devices such as CMOS electronic devices. Photonic chips allow systems with high complexity and multiple functions to be integrated on a single substrate to thereby allow the generation, detection, propagation and modulation of both optical and electrical signals. Photonic chips may employ a variety of different material systems, including silicon, silicon nitride, polymer, silicon dioxide, ion-exchange glass, lithium niobate, InP, GaAs, and graphene, and optical interconnection processes should be compatible with these material systems. In some cases polymer waveguides are used to interconnect optical devices such as photonic chips to other photonic chips and Optical Printed Circuit Boards (OPCB).

SUMMARY

In accordance with one aspect of the subject matter described herein, a method is provided for forming an optical interconnect between first and second photonic chips located on an optical printed circuit board (OPCB). In accordance with the method, a flexible, freestanding film is applied onto the first and second photonic chips so that the film extends over a gap and/or step between the first and second photonic chips. The film includes a photosensitive layer and a backing layer attached to the photosensitive layer using an adhesive. The photosensitive layer includes a photosensitive material having a refractive index that decreases by exposure to radiation. The film is exposed to a flood exposure of radiation having a first dosage that penetrates through the backing layer and only a surface sublayer of the photosensitive layer. The film is heated to cure the surface sublayer of the photo sensitive layer. The backing layer is removed from the film so that the photosensitive layer remains on the first and second photonic chips. The photosensitive layer is selectively exposed to a second dosage of radiation to define one or more waveguide cores in unexposed regions of the photosensitive layer below the surface sublayer. The photosensitive layer is heated to cure portions of the photosensitive layer that have been selectively exposed to the second dosage of radiation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
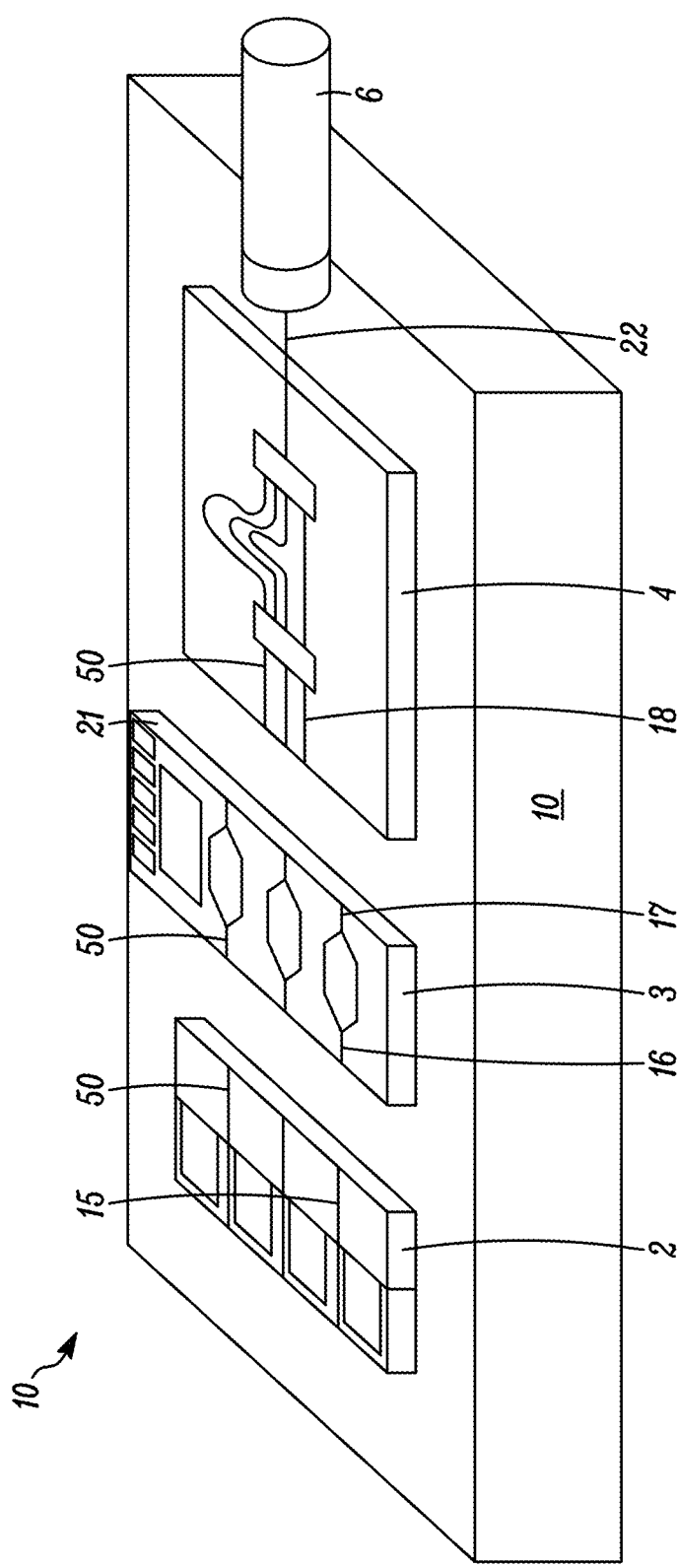
FIG. 1 shows one example of a photonic integrated arrangement in which photonic chips located on an optical printed circuit board or other substrate are to be optically interconnected using the techniques described herein.

Described herein is a method of fabricating an optical interconnect between two photonic chips that are physically separated with a planar gap and/or an off-plane step in height. The optical interconnect is a polymer film in which one or more waveguides are formed. An example of a photonic integrated arrangement in which the optical interconnect may be employed is shown in FIG. 1.

Photonic integrated arrangement 10 includes multiple photonic systems that are integrated on different photonic chips 2, 3 and 4 and which contain lateral single-mode waveguides 50. The waveguides 50 positioned on different chips are to be interconnected and/or are to be connected to input/output optical fiber 6. The various components 2, 3 and 4 are mounted on a substrate 10 that serves as a component carrier. The components of the photonic integrated arrangement 100 are to be interconnected with optical interconnect structures at connecting points 15, 16, 17 and 18. For instance, one optical interconnect structure may interconnect points 15 and 16 and another optical interconnect structure may interconnect points 17 and 18.

A polymer waveguide can be used to couple light from one photonic chip to another photonic chip. The polymer waveguide can be defined using lithographic techniques in which a dry polymer negative resist film is exposed to ultraviolet light (UV) and subsequently baked. Illustrative examples of such techniques are shown in patent application Ser. No. 15/764,064, PCT/US18/15965, and PCT/US18/47455, which are incorporated by reference herein and constitute part of the present disclosure. The polymer resist material in the film is chosen so that, after thermal treatment, the region of the material that is exposed to the UV radiation has a lower refractive index than the region that is not exposed to the UV radiation. The region of the polymer resist material that is exposed by the UV light has a higher mechanical strength while un-exposed regions of the polymer resist material behave like a paste, and thus have little or no mechanical strength.

A typical commercially available dry resist film is a three-layer construct: two polyester (e.g., polyethylene terephthalate or PET) thin film layers and a polymer photoresist layer sandwiched between the two PET thin film layers. Thin layers of adhesive are used between each of the PET thin film layers and the photoresist layer. It should be noted that the dry resist film, while the resist layer is intact with both or one PET films, is a flexible, free-standing, self-supporting structure and is not to be construed as a thin resist layer that is formed on a free-standing, self-supporting structure and which does not exist apart from the free-standing, self-supporting structure.

Figure 2A:
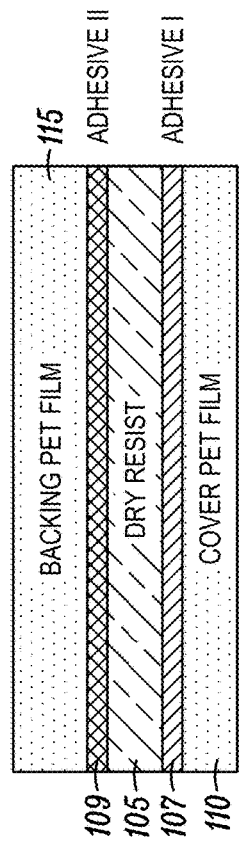
FIGS. 2A-2C show a sequence of steps in which an optical interconnect is formed on a photonic chip.
Figure 2B:
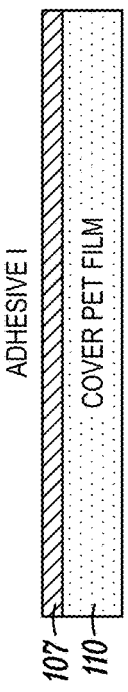
Figure 2B:
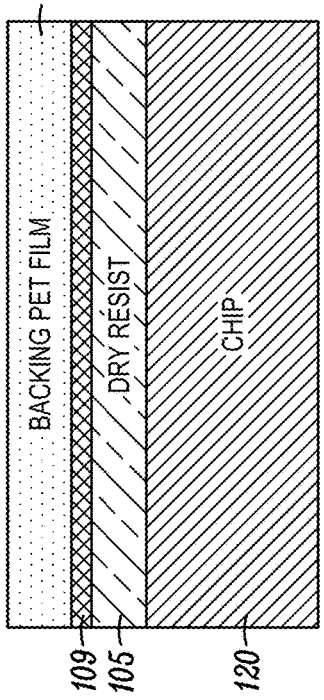
Figure 2C:
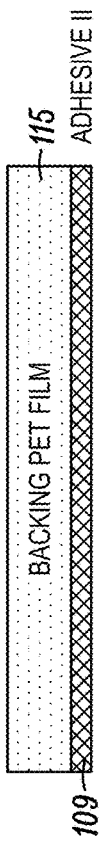
Figure 2C:
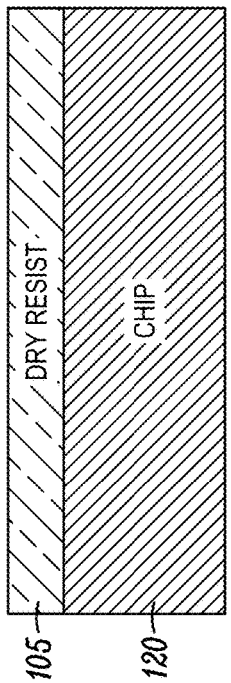

FIG. 2A shows an example of a dry resist film 100 that includes a dry resist layer 105, cover film 110 secured to the dry resist layer 105 with a first adhesive layer 107 and a backing film 115 secured to the dry resist layer 105 with a second adhesive layer 109. In FIG. 2B the cover film 110, along with the first adhesive layer 107, has been peeled away and the dry resist layer 105 applied to the surface of a photonic chip 120. Next, in FIG. 2C the backing film 115, along with the second adhesive layer 109, is peeled away, leaving the dry resist layer 105 on the photonic chip 120.

Since the dry resist layer 105 remains on the photonic chip 120 when the backing film 115 is removed, it is evident that the adhesion of the dry resist layer 105 to the chip surface is stronger than the adhesion of the dry resist layer 105 to the backing film 115. For applications of this method to an interconnect that is to span two photonic chips that have a gap and/or a step between them, when peeling off the backing film, the resist layer stays on the surfaces of both chips. However, the resist layer breaks and comes off with the backing film at the gap between the chips since there is no solid surface for the resist layer to attach to. This problem is illustrated in the sequence of steps shown in FIGS. 3A-3C.

Figure 3A:
FIGS. 3A-3C shows a sequence of steps that unsuccessfully attempt to form an optical interconnect between two photonic chips that have a gap and/or step between them.
Figure 3B:
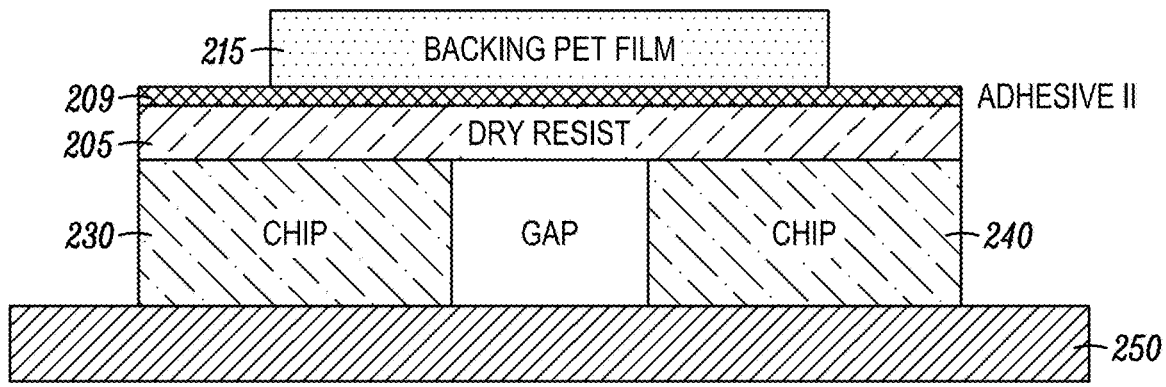

FIG. 3A shows an example of a dry resist film 200 similar to the dry resist film 100 shown in FIG. 2A. Dry resist film includes dry resist layer 205, cover film 210 secured to the dry resist layer 205 with a first adhesive layer 207 and a backing film 215 secured to the dry resist layer 205 with a second adhesive layer 209. In FIG. 3B the cover film 210, along with the first adhesive layer 207, has been peeled away and the dry resist layer 205 applied to the surfaces of photonic chips 230 and 240, which have a gap between them. Photonic chips 230 and 240 are mounted on a substrate 250 such as an optical printed circuit board (OPCB). Next, in FIG. 3C the backing film 215, along with the second adhesive layer 209, is peeled away. As shown, when removing the backing film 215, the portion 205a of the dry resist layer 205 located over the gap breaks off and is removed along with the backing film 215.

Figure 3C:
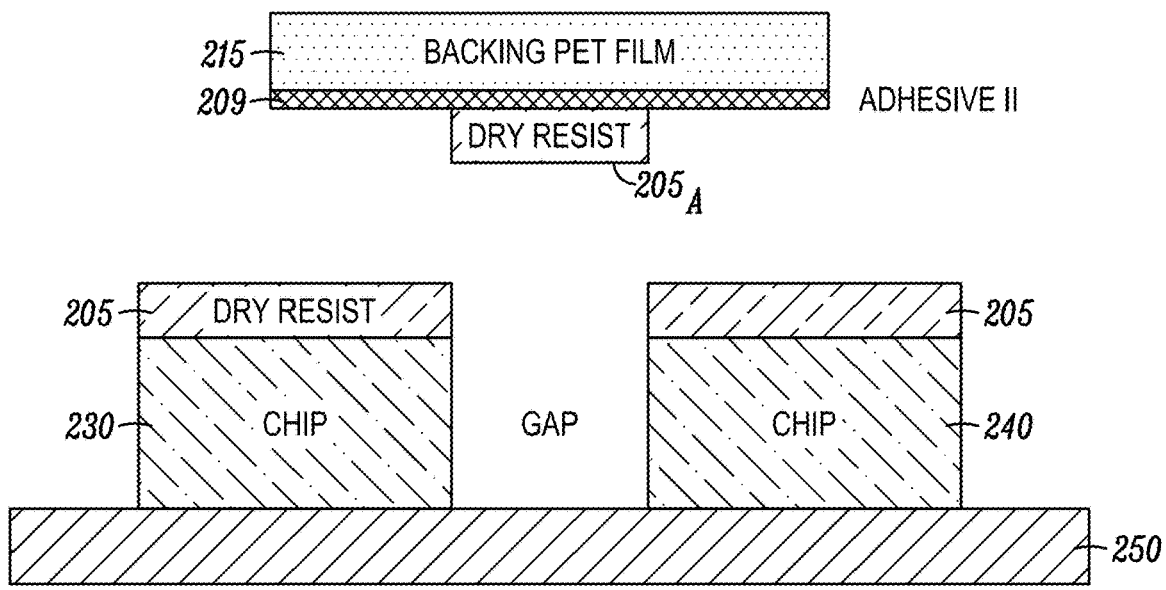

As evident from FIGS. 3A-3C, the absence of the dry resist layer over the gap makes it impossible to establish interconnecting waveguides between the photonic chips. It is thus important to develop a method so that the dry resist layer is able to physically bridge a gap and/or step between two photonic chips to ultimately realize optically interconnecting polymer waveguides.

As previously mentioned, the region of a dry resist layer that is exposed by the UV light has a higher mechanical strength while un-exposed regions of the resist behave like a paste, and thus have little or no mechanical strength. This characteristic of the resist material may be used to address the problem of establishing an optical interconnect over a gap and/or step between photonic chips. In particular, a low-dosage exposure on the dry resist layer can be utilized to realize a mechanical bridge over a gap and/or step between the two chips before removal of the backing film.

Figure 4A:
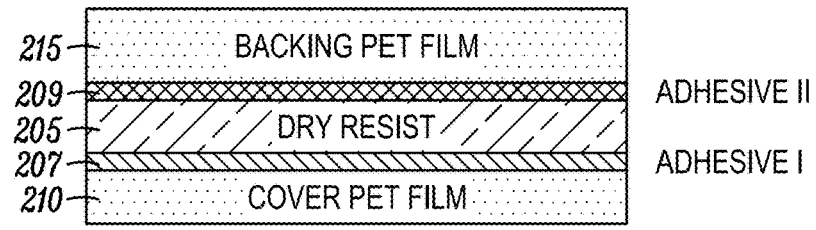
FIGS. 4A-4E show a sequence of steps in which two photonic chips that have a gap and/or step between them are optically coupled by an optical interconnect that is formed using the techniques described herein.
Figure 4B:
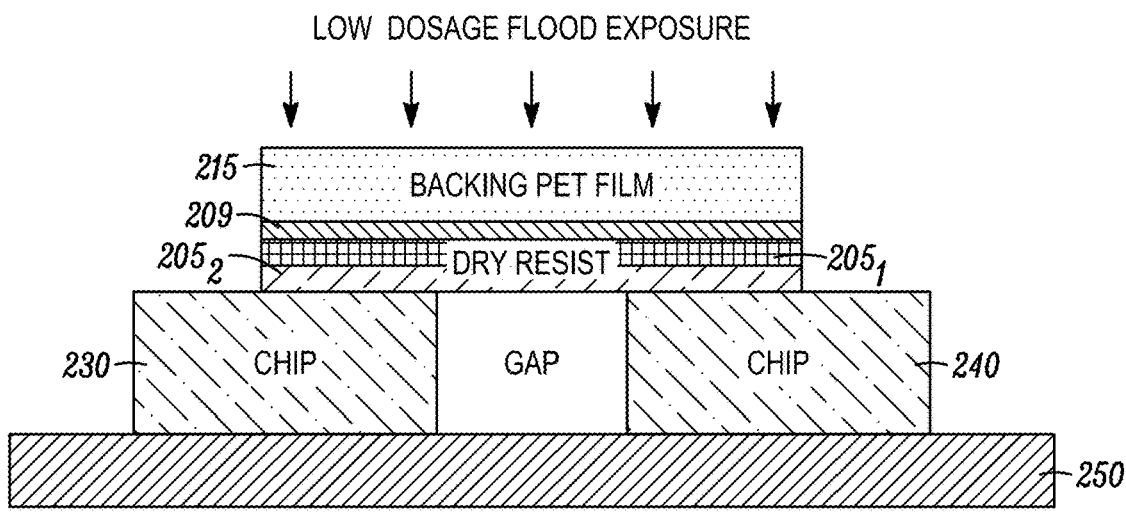

This process is illustrated by the sequence of steps shown in FIGS. 4A-4D. In FIGS. 3 and 4, as well as the FIGS. that follow, like elements are denoted by like reference numerals. FIG. 4A shows the dry resist film 200 of FIG. 3A. In FIG. 4B the cover film 210 of the dry resist film 200 has been removed and the dry resist layer 205 is laminated to the photonic chips 230 and 240 so that the dry resist layer 205 spans the gap between them. As further shown in FIG. 4B, a flood exposure of ultraviolet (UV) radiation is applied at a very low dosage through the backing film 215. The UV dosage is sufficiently low so that only a very topmost sub-layer $205_1$ of the dry resist layer 215 is exposed, while the remaining resist $205_2$ closer to the surface of the chips 230 and 240 remains un-exposed. The dry resist film, including PET 215 and dry resist $205_1$ and $205_2$, is then baked at a moderate temperature to crosslink the exposed top sub-layer $205_1$ of the resist. The top sub-layer $205_1$ of the cross-linked resist exhibits significant mechanical strength.

Figure 4C:
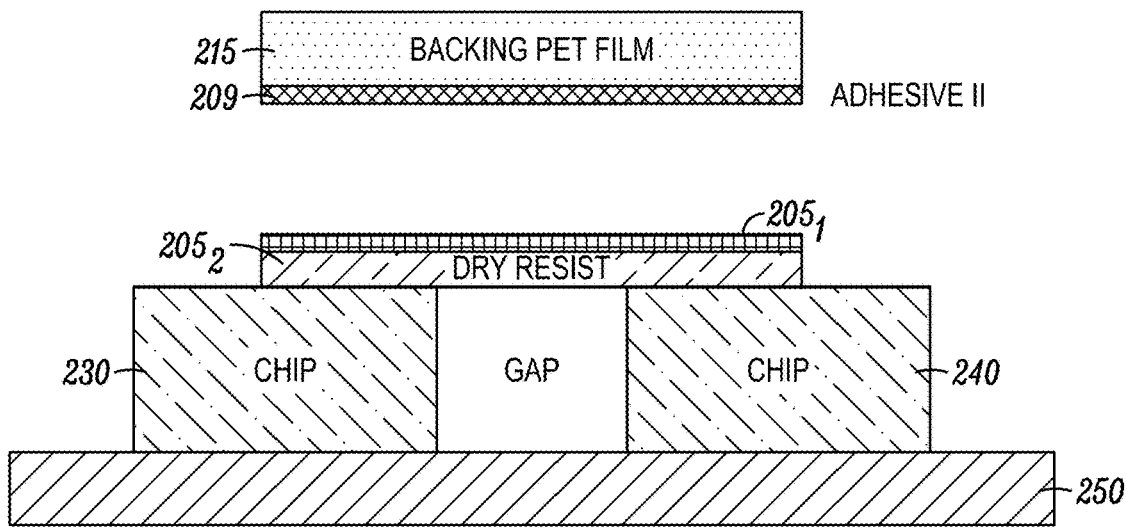
Figure 4D:
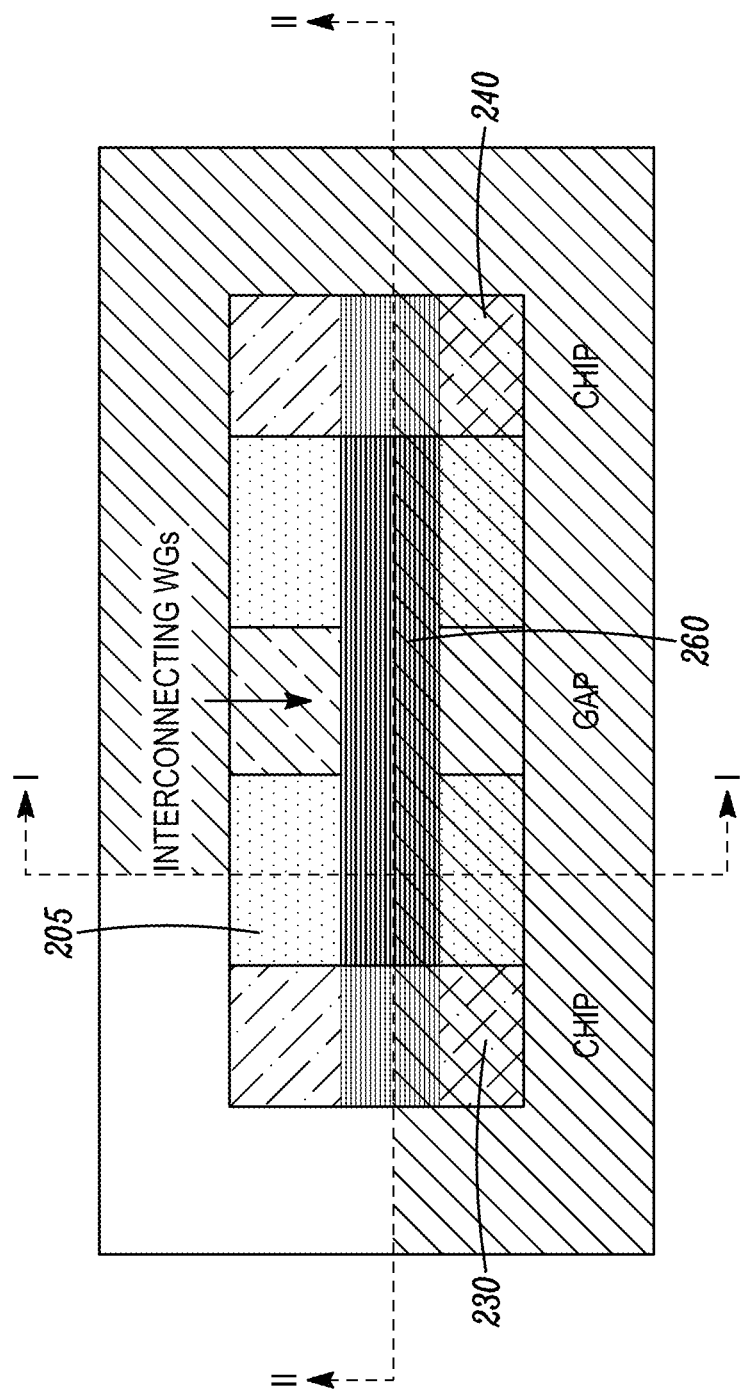
Figure 4E:
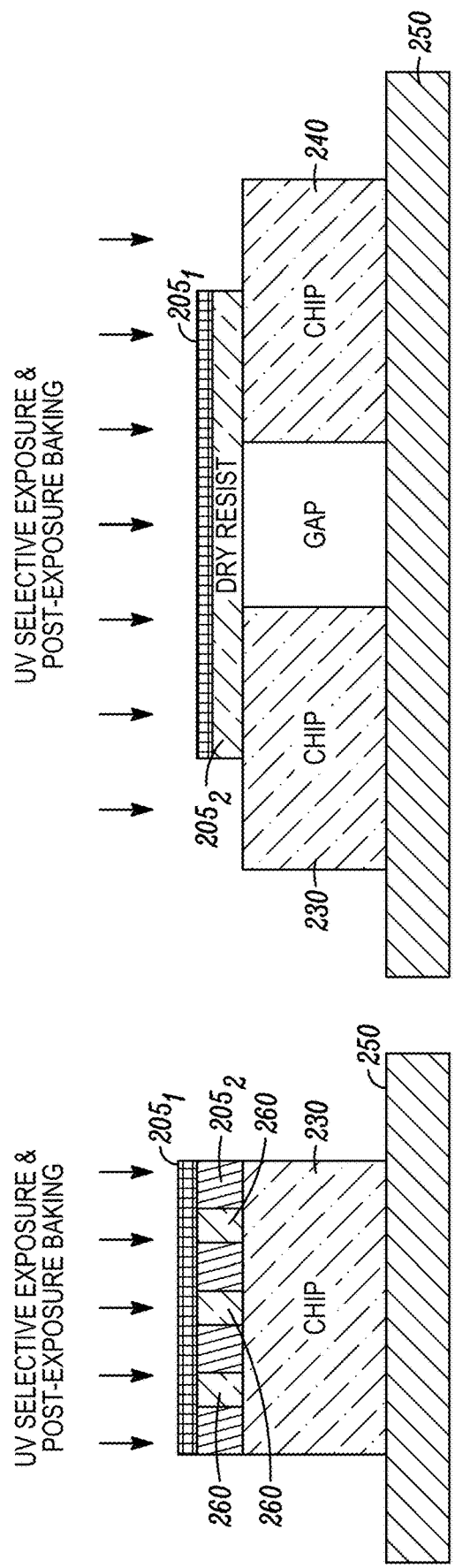

As shown in FIG. 4C, when peeling off the backing film 215 after the flood exposure and subsequent baking, the resist layer 205 remains intact on the surfaces of both photonic chips 230 and 240 and bridges the gap between them. Subsequently, one or more interconnect waveguides with designated dimensions and alignments to the waveguides located on each photonic chip can be defined using selective UV exposure or UV direct writing in the polymer resist layer at higher dosages. This is illustrated in FIG. 4D, which shows a plan view of the photonic chips 230 and 240 on which the optical interconnect is located after the waveguides 260 have been defined in the dry resist layer 205. Likewise, FIG. 4E shows views taken along lines I-I and II-II of FIG. 4D after the waveguides 260 have been formed. Examples of techniques for defining the interconnect waveguides are described in the aforementioned references which are attached herewith.

In one embodiment, a dry resist film manufactured by Tokyo Ohka Kogyo America Inc (TOKA) can be used as the waveguide material. Alternatively, other polymer resist materials that exhibit a change in refractive index by application of UV radiation and thermal processing and which may be employed include, without limitation, one or more different formulations of SU-8, ZPU12/ZPU13, Lightlink, EpoCore/EpoClad, SEO 250, MAPTMS/ZPO, polymethylmethacrylate, polycarbonate, Cytop, and RHTi1.

More generally, any polymer resist material with the following properties can be used to establish the mechanical bridge over a gap and/or step for realization of interconnecting waveguides using the on-chip fabrication approach: (1) the material is photosensitive and can be made into a stable, dry, uniform and flexible layer sandwiched between supporting layers, which together define a flexible, free-standing film, (2) the photosensitive material has a low optical loss at the operating wavelength of the waveguide, (3) the mechanical strength of the photosensitive material is established by UV exposure (UV cross-linking) and subsequent baking (thermal cross-linking), (4) the refractive index of the photosensitive material is reduced by exposure of light (e.g., UV), (5) the refractive index of un-exposed material can be manipulated utilizing baking at elevated temperatures, and (6) the profile of the refractive index can be defined with high resolution, e.g., approximately the wavelength at which the waveguide is to operate.

Figure 5A:
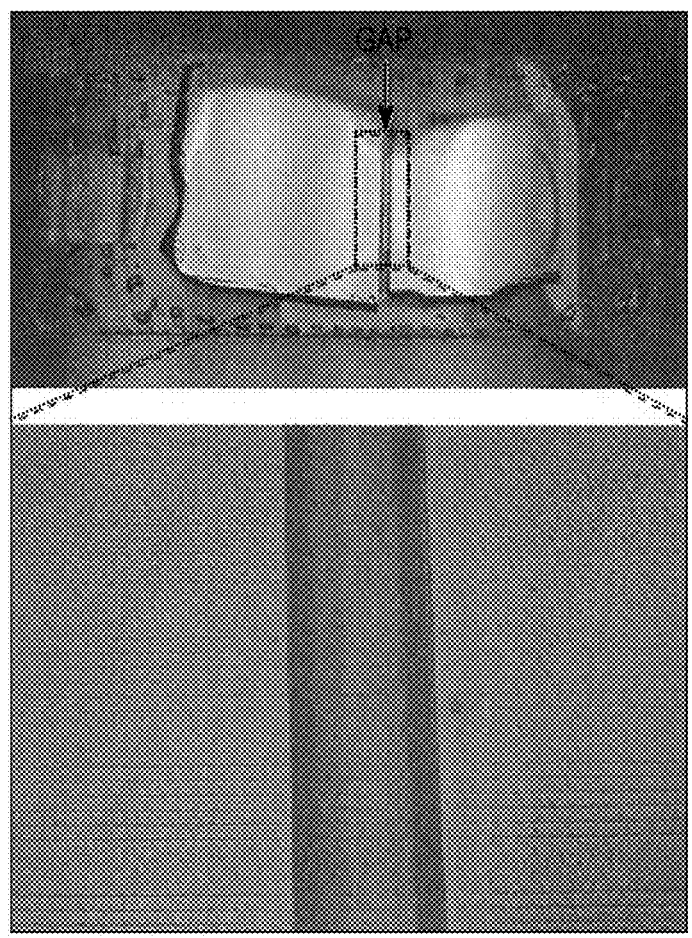
FIG. 5A is a photograph showing the two photonic chips with an planar gap between them (upper image) and an expanded view of the gap showing the array of interconnect waveguides that extends across the gap (lower image)
Figure 5B:
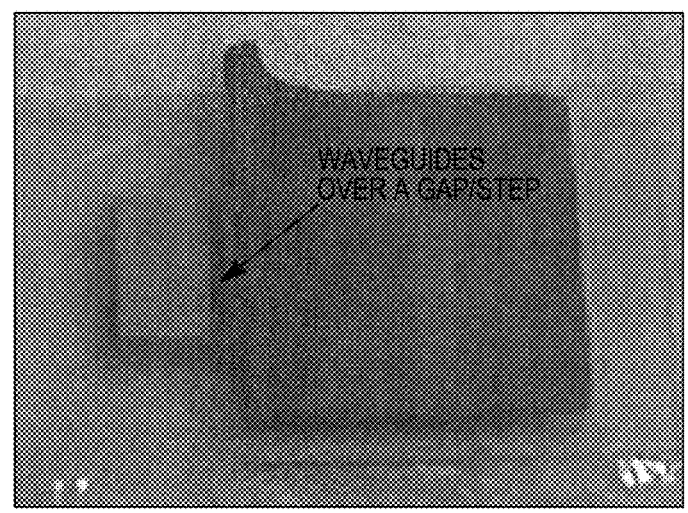
FIG. 5B is a photograph showing the interconnect waveguides spanning a gap and an off-plane step between two chips, which were fabricated using the techniques described herein.

FIG. 5A is a photograph showing the two photonic chips with a planar gap between them (upper image) and an expanded view of the gap showing the array of interconnect waveguides that extends across the gap (lower image). FIG. 5B is a photograph showing the interconnect waveguides spanning a planar gap and an off-plane step, which were fabricated using the techniques described herein. The waveguides are 8 µm in width and about 10 µm in height and can be realized on both photonic chips across a gap of 500 µm and a step of 25 µm. The exposed top portion of the resist exhibits a lower refractive index compared to that of unexposed thermally cross-linked resist. The top portion of the resist serves as a top cladding layer to the waveguide core.

The exposure dosage defines the penetration depth of the radiation into the dry resist layer and thus determines the mechanical structural properties as well as the dimensions of the optical waveguides. An optimal dosage can be established to form the strongest possible mechanical structure over a gap and/or step while allowing a sufficient unexposed thickness of resist to remain for accommodating the desired dimensions of the optical waveguide feature.

Figure 6:
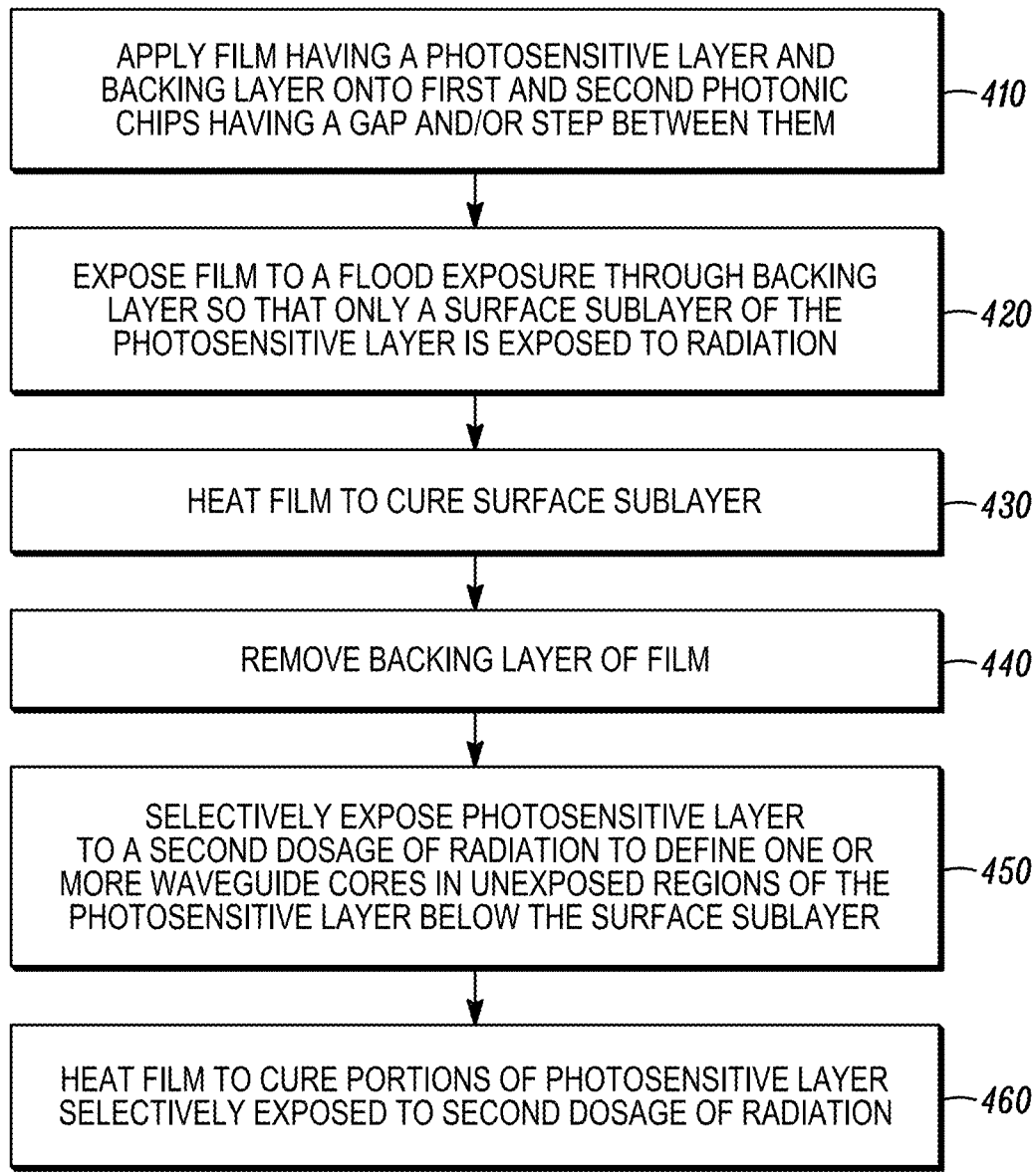
FIG. 6 is a flowchart showing one particular example of a method of forming an optical interconnect between first and second photonic chips located on an optical printed circuit board (OPCB).

FIG. 6 is a flowchart showing one example of a method of forming an optical interconnect between first and second photonic chips located on an optical printed circuit board (OPCB). First, at step 410 a flexible, freestanding film is applied onto the first and second photonic chips so that the film extends over a gap and/or step between the first and second photonic chips. The film includes a photosensitive layer and a backing layer attached to the photosensitive layer using an adhesive. The photosensitive layer includes a photosensitive material such as a polymer negative resist having a refractive index that decreases by exposure to radiation.

In one embodiment the surface of the photonic chips includes waveguides such as silicon-on-insulator (SOI) waveguides that are to be optically coupled by the optical interconnect that is being formed. The waveguides may have inverse tapers to allow adiabatic coupling between the waveguides on the surface of the photonic chips and the waveguides that are to be formed in the optical interconnect.

At step 420 the film is exposed to a flood exposure of radiation having a first dosage that penetrates through the backing layer and only a surface sublayer of the photosensitive layer. The film is then heated at step 430 to cure the surface sublayer of the photosensitive layer. In this way the mechanical strength of the photoresist layer is increased. At step 440, the backing layer is removed from the film so that the photosensitive layer remains on the first and second photonic chips. Because of its increased mechanical strength, the photoresist layer does not break when the backing layer is removed.

Continuing on to step 450, in one embodiment a maskless lithography system that includes a control system and a vision system is used to measure the locations where the waveguides are to be formed. These measurements are used to generate mask layout data, which in turn is used to pattern the waveguide(s) by selectively exposing the photosensitive layer to a second dosage of radiation to define the waveguide core(s) in the unexposed regions of the photosensitive layer below the surface sublayer. Of course, in other embodiments the waveguide(s) may be patterned using other lithographic techniques. Finally, the photosensitive layer is heated in step 460 to cure the portions of the photosensitive layer that have been selectively exposed to the second dosage of radiation.

In one alternative embodiment, the dry resist film can be exposed to UV radiation at a low dosage from the backing film side before laminating it onto the chips with the gap and/or step between them. In this way the mechanical strength of the film can be increased before it is applied to the chips. However, it is important that the film remains flexible and that the gap and/or step is small.

In another alternative embodiment, if a larger tolerance on the waveguide dimensions is acceptable, the waveguide cores may be patterned prior to removal of the backing film. In this embodiment the resist layer is laminated on the photonic chips with a gap and/or step between them. Without peeling off the backing film, the resist layer is patterned to form the waveguide cores in the resist by selective UV exposure through the backing layer. The UV exposed features, serving as side cladding to the waveguide cores, collectively establish a mechanical bridge over the gap and/or step between the two photonic chips after post-exposure baking. At this stage, when the backing film is peeled off and the resist layer, with both exposed and un-exposed areas, remains on both photonic chips and extends over the gap and/or step. After a final hard bake of the resist, the polymer waveguides are realized. Selective exposure through the backing film (which may be, e.g., 50 µm in thickness) will generally result in the dimensions of fabricated waveguide being reduced in accuracy. If larger tolerances (e.g., greater than >1 µm) are acceptable for certain applications, this approach provides an alternative way to establishing interconnecting waveguides on two photonic chips over a gap and/or step.

The depth of the flood exposure into the resist layer will generally need to be adjusted based on the gap and/or step dimensions. A larger gap and/or step requires deeper exposure into the resist so that the mechanical strength is adequate to suspend the resist over the gap and/or step. However, higher dosages risk exposing the entire thickness of the resist, and as a result, waveguide features will not able to be formed. In addition, the resist layer may sag over larger gaps, resulting in poor optical performance of the waveguides. Larger steps may also cause the exposure plane in the resist layer to deviate in pitch so that it is not level with the surface of the OPCB, which may result in waveguides being fabricated with inaccurate dimensions. Accordingly, the techniques described herein may be most suitable to on-chip fabrication of interconnecting waveguides over relatively small gaps (e.g., less than 1 mm) and small steps (e.g., less than 40 µm).

While exemplary embodiments and particular applications of this invention have been shown and described, it is apparent that many other modifications and applications of this invention are possible without departing from the inventive concepts herein disclosed.

The invention claimed is:

1. A method of forming an optical interconnect between first and second photonic chips located on an optical printed circuit board (OPCB), comprising:
    applying a flexible, freestanding film onto the first and second photonic chips so that the film extends over a gap and/or step between the first and second photonic chips, the film including a photosensitive layer and a backing layer attached to the photosensitive layer using an adhesive, the photosensitive layer including a photosensitive material having a refractive index that decreases by exposure to radiation;
    exposing the film to a flood exposure of radiation having a first dosage that penetrates through the backing layer and only a surface sublayer of the photosensitive layer;
    heating the film to cure the surface sublayer of the photo sensitive layer;

removing the backing layer from the film so that the photosensitive layer remains on the first and second photonic chips;

selectively exposing the photosensitive layer to a second dosage of radiation to define one or more waveguide cores in unexposed regions of the photosensitive layer below the surface sublayer; and heating the photosensitive layer to cure portions of the photosensitive layer that have been selectively exposed to the second dosage of radiation.

2. The method of claim 1, wherein the flexible film includes a cover layer attached with adhesive to a surface of the photosensitive layer opposite the backing layer, and further comprising removing the cover layer from the flexible film prior to applying the flexible film onto the first and second photonic chips.

3. The method of claim 1, wherein the photosensitive material includes a polymer negative resist.

4. The method of claim 3, wherein the backing layer includes a polyester film.

5. The method of claim 1, wherein selectively exposing the photosensitive layer to the second dosage of radiation is performed using a mask.

6. The method of claim 1, wherein selectively exposing the photosensitive layer to the second dosage of radiation is performed using a maskless lithography process.

7. The method of claim 1, wherein the radiation includes UV radiation.

8. The method of claim 1, wherein the waveguide core is configured as a single mode waveguide at a specified optical wavelength.

9. The method of claim 1, wherein exposing the film to a flood exposure of radiation is performed after applying the flexible film onto the first and second photonic chips.

10. The method of claim 1, wherein exposing the film to a flood exposure of radiation is performed before applying the flexible film onto the first and second photonic chips.

11. The method of claim 1, wherein selectively exposing the photosensitive layer to a second dosage of radiation is performed after removing the backing layer.

12. The method of claim 1, wherein selectively exposing the photosensitive layer to a second dosage of radiation is performed before removing the backing layer.

13. An optical package fabricated in accordance with the method of claim 1.

* * * * *